United States Patent [19]
Shutty et al.

[11] Patent Number: 5,938,716
[45] Date of Patent: Aug. 17, 1999

[54] SYSTEM FOR CUSTOMIZING VEHICLE ENGINE CONTROL COMPUTER OPERATION

[75] Inventors: John V. Shutty; John J. Kaehler; Chris Nelson, all of Columbus, Ind.

[73] Assignee: Cummins Engine Company, Inc., Columbus, Ind.

[21] Appl. No.: 08/925,514

[22] Filed: Sep. 8, 1997

[51] Int. Cl.[6] .................................................. G06F 13/00
[52] U.S. Cl. .............................. 701/115; 701/102; 701/33
[58] Field of Search .................................. 701/102, 115, 701/101, 33, 35, 117, 123; 364/131, 134

[56] References Cited

U.S. PATENT DOCUMENTS

| | | | |
|---|---|---|---|
| H513 | 8/1988 | Duanne et al. | 364/133 |
| 4,730,256 | 3/1988 | Niimi et al. | 701/115 |
| 5,091,856 | 2/1992 | Hasegawa et al. | 701/36 |
| 5,200,900 | 4/1993 | Adrain et al. | 701/115 |
| 5,276,619 | 1/1994 | Ohara et al. | 701/115 |
| 5,278,759 | 1/1994 | Berra et al. | 701/35 |
| 5,293,317 | 3/1994 | Adrain et al. | 701/115 |
| 5,305,219 | 4/1994 | Ishibashi et al. | 701/35 |
| 5,369,991 | 12/1994 | Armstrong | 73/119 A |
| 5,430,647 | 7/1995 | Raad et al. | 701/38 |
| 5,440,405 | 8/1995 | Ahmed | 358/435 |
| 5,446,665 | 8/1995 | Adrian et al. | 701/102 |
| 5,459,660 | 10/1995 | Berra | 701/33 |
| 5,523,948 | 6/1996 | Adrian | 701/115 |
| 5,541,840 | 7/1996 | Gurne et al. | 701/33 |
| 5,548,781 | 8/1996 | Huang | 395/831 |
| 5,777,565 | 7/1998 | Hayashi et al. | 340/928 |
| 5,802,485 | 9/1998 | Koelle et al. | 701/115 |

*Primary Examiner*—Tony M. Argenbright
*Assistant Examiner*—Hieu T. Vo
*Attorney, Agent, or Firm*—Beck, Michael & Beck, P.C.

[57] ABSTRACT

A system for customizing the operation of a vehicle/engine control computer includes a memory card having control computer customizing information stored thereon and a memory card interface unit having at least one signal line connected to at least one existing input signal line of the vehicle/engine control computer. In one embodiment, the memory card interface unit includes a control device operable to control a number of switches each connected to one of a corresponding number of switched input signal lines of the vehicle/engine control computer. The control device is operable to read the control computer customizing information from the memory card and control the states of the number of switches to thereby transfer the control computer customizing information to the vehicle/engine control computer. In another embodiment, at least one output of the control device is connected to an existing high frequency input signal line of the vehicle/engine control computer, and the control device is operable to transfer the control computer customizing information to the vehicle/engine control computer via the high frequency signal line. In yet another embodiment, the control device is connected to the vehicle/engine control computer via an existing data link, and is operable to transfer the control computer customizing information to the vehicle/engine control computer over the data link. The memory card may include electronic or magnetic memory, and may transfer the control computer customizing information to the control device of the memory card interface unit via known contacting or contactless techniques.

26 Claims, 6 Drawing Sheets

FIG. 6 though aspects of the present invention apply equally to

SYSTEM FOR CUSTOMIZING VEHICLE ENGINE CONTROL COMPUTER OPERATION

FIELD OF THE INVENTION

The present invention relates generally to systems for accessing a vehicle/engine control computer, and more specifically to such systems operable to customize operation thereof in accordance with information contained in a memory device.

BACKGROUND OF THE INVENTION

In electronically controlling a motor vehicle, it is known to be desirable to provide an engine or vehicle control computer (hereinafter vehicle/engine control computer) with information that allows for customized operation thereof. In general, it is known to provide the vehicle/engine control computer with information related to the current vehicle operator, current trip or route, desired usage, and the like, to thereby allow for customization of the way in which the computer electronically controls the internal combustion engine and other vehicle components, as well as the way in which it records diagnostic and other information.

Numerous systems and techniques are known for providing a vehicle/engine control computer with driver identification and other customizing information. Known examples include systems for manually typing in codes, using elaborate card reading systems and using special ignition keys which have information coded therein, to name a few. However all such known systems suffer from several drawbacks including high cost, requirement of a unique operator interface for operation thereof, and the requirement of changes and/or additions to the vehicle/engine control computer and/or the physical interface between the vehicle/engine control computer and the various vehicle/engine systems. What is therefore needed is an improved vehicle/engine control computer customizing system that does not suffer from the foregoing drawbacks. Ideally, such a system should be low cost, be easily installed and easy to use, and require no restructuring or reconfiguration of the existing vehicle/engine system hardware.

SUMMARY OF THE INVENTION

The foregoing shortcomings of the prior art are addressed by the present invention. In accordance with one aspect of the present invention, a system for customizing operation of a vehicle/engine control computer comprises a vehicle/engine control computer having a number of existing signal paths connected to a corresponding number of inputs thereof, a memory card including means for storing control computer customizing information thereon, and a memory card interface unit electrically connected to the vehicle/engine control computer via at least one of the number of existing signal paths. The memory card interface unit is operable to transfer the control computer customizing information from the memory card to the vehicle/engine control computer over the at least one of the number of existing signal paths, the vehicle/engine control computer thereafter operating in accordance with the control computer customizing information.

In accordance with another aspect of the present invention, a method of customizing operation of a vehicle/engine control computer via control computer customizing information contained on a memory card, wherein the vehicle/engine control computer has a number of existing signal paths connected to a corresponding number of inputs thereof and a memory card interface unit connected thereto via at least one of the number of existing signal paths, comprises the steps of monitoring the memory card interface unit for the presence of control computer customizing information, transferring the control computer customizing information to the vehicle/engine control computer via the at least one existing signal path upon detection of the control computer customizing information at the memory card interface unit, and operating the vehicle/engine control computer in accordance with the control computer customizing information.

One object of the present invention is to provide a system for customizing vehicle/engine control computer operation that interfaces with the vehicle/engine control computer via existing signal lines connected thereto.

Another object of the present invention is to provide such a system operable to transfer control computer customizing information from a memory card to the vehicle/engine control computer.

These and other objects of the present invention will become more apparent from the following description of the preferred embodiments.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 1:
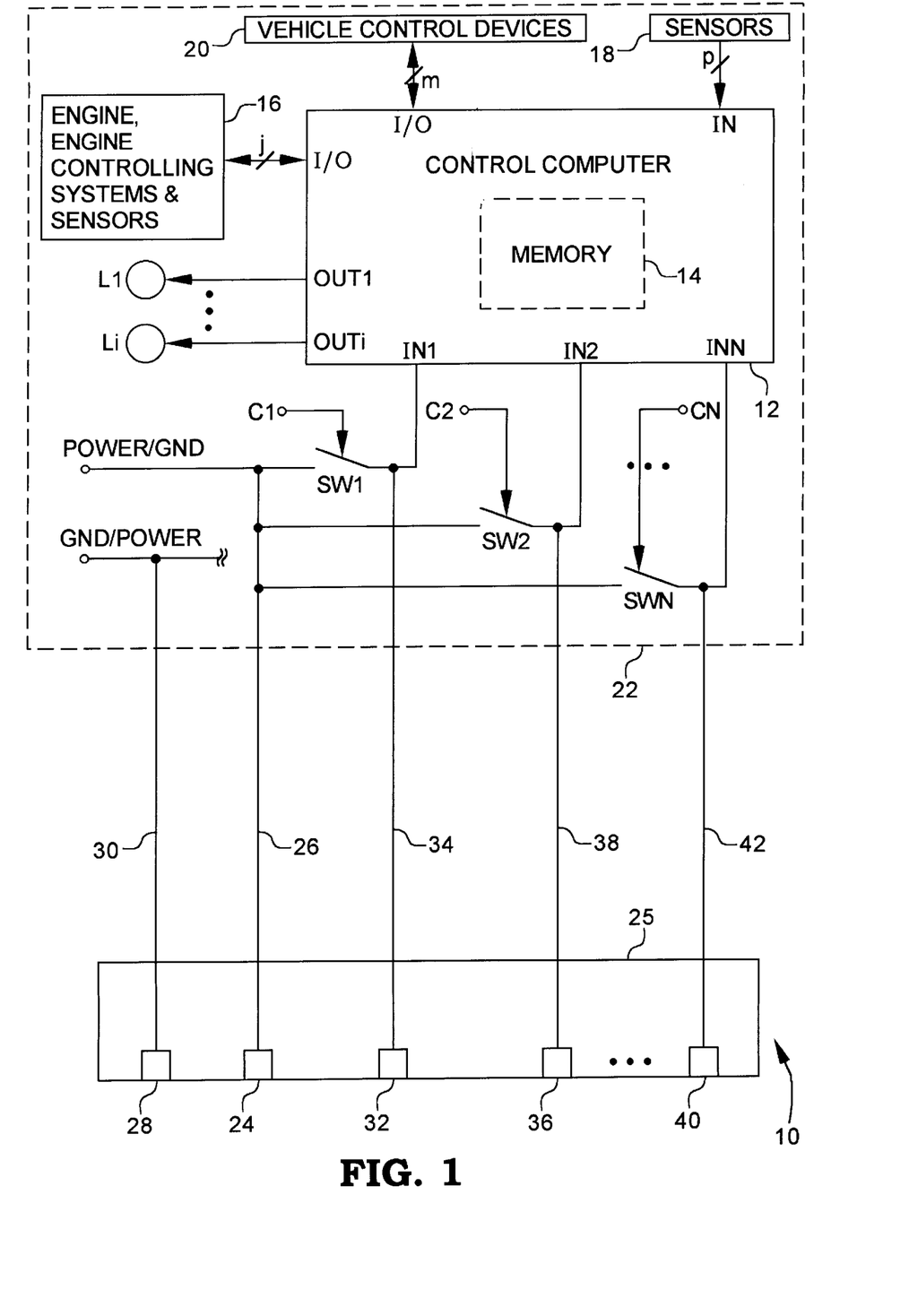
FIG. 1 is a diagrammatic illustration of one embodiment of a system for customizing vehicle/engine control computer operation, in accordance with one aspect of the present invention.

Referring now to FIG. 1, one embodiment of a system 10 for customizing vehicle/engine control computer operation, in accordance with one aspect of the present invention, is shown. System 10 includes a vehicle/engine control computer 12 operable to electronically control an internal combustion engine 16, as is known in the art, and/or control systems/devices of a vehicle 22 carrying the engine 16, as is known in the art. For the purposes of the present invention, vehicle/engine control computer 12, as this term is used herein, should therefore be understood to represent a known engine control computer, commonly known as an Engine Control Module (ECM), Engine Control Unit (ECU) or the like, or a known control computer associated with the vehicle 22, commonly known as a Vehicle Control Module (VCM) or the like, that is in communication with an engine control computer operable to electronically control internal combustion engine 16. In any event, vehicle/engine control computer 12 includes a memory unit 14 operable to store and maintain diagnostic and other engine, vehicle, route, driver, vehicle usage and/or other information therein, as well as to store software algorithms therein. Vehicle/engine control computer 12 is operable to execute such algorithms, as is known in the art, to thereby control various engine and/or vehicle devices/systems, and to further collect, manage and otherwise maintain diagnostic and other information.

Vehicle/engine control computer 12 includes an I/O port that is electrically connected to engine 16 via a number of signal paths, j, as is known in the art, wherein j may be any integer, and wherein engine 16 is understood to include known engine controlling systems and sensors. Examples of signals supplied to, or received from, engine 16 include, but are not limited to, fueling signals operable to control an engine fueling system, engine speed signals, cruise control signals, and the like. The I/O port (or another I/O port associated with vehicle/engine control computer 12) is further electrically connected to a number of vehicle control devices and/or systems 20 via a number, m, of signal paths, as is known in the art wherein m may be any integer. An input port IN of vehicle/engine control computer 12 is electrically connected to one or more sensors 18 associated with the vehicle 22, as is known in the art, via a number, p, of signal paths wherein p may be any integer. Examples of signals supplied by vehicle/engine control computer 12 to vehicle control systems/devices 20 include, but are not limited to, anti-lock brake signals, climate control signals, vehicle lighting signals and the like, and examples of signals provided by vehicle sensors 18 to vehicle/engine control computer 12 include, but are not limited to, vehicle speed signals, ambient air temperature signals and the like.

Vehicle/engine control computer 12 further includes a number of outputs $OUT_1$–$OUT_i$, where i may be any integer, each having an illumination device $L_2$–$L_i$ electrically coupled thereto. As they relate to the present invention, illumination devices $L_1$–$L_i$ preferably represent existing instrument panel illumination devices such as "check engine", "oil pressure" and like lamps.

In system 10 illustrated in FIG. 1, vehicle/engine control computer 12 further includes a number, N, of "switched input" signal paths connected to inputs IN1–INN thereof. The term "switched input", as it relates to the present invention, is defined as a discrete input to vehicle/engine control computer 12 operable to receive a binary-valued signal (i.e. either a logic high or a logic low) thereat. In the embodiment shown in FIG. 1, each of the inputs IN1–INN are connected to one end of a corresponding switch SW1–SWN, the opposite end of which is connected to either an electrical power signal or ground potential (shown in FIG. 1 as POWER/GND), and each of which are controlled by a corresponding switch control C1–CN. In one preferred embodiment, switch controls C1–CN are known and existing switches available in the cab area of the vehicle such as, for example, a cruise control "on/off" switch, a cruise control "resume/accel" switch, an accelerator pedal idle indication switch, and the like. As is known in the art, the vehicle 22 further includes a GND/POWER signal path for completing the electrical circuit.

Thus far, all of the components discussed hereinabove are known vehicle/engine electrical components and, inasmuch as the present invention is concerned, are existing vehicle components having corresponding existing signal paths. In fact, an important aspect of the present invention, as will become more apparent from the description hereinafter, is that all additional components for customizing vehicle/ engine control computer operation according to the invention are operable to interface with the vehicle/engine control computer 12 via these existing signal paths, thereby requiring no additional inputs to vehicle/engine control computer 12. The vehicle/engine control computer 12 is operable to receive such control computer customizing information and operate thereafter in accordance with this customizing information as is known in the art. Those skilled in the art will recognize that vehicle/engine control computer 12 may be programmed or reprogrammed for operation in accordance with the customizing information according to many different techniques, and such techniques are known and understood in the vehicle and engine control computer arts.

One embodiment of such additional componentry operable to interface with the vehicle/engine control computer 12 via existing signal paths is illustrated in FIG. 1 and comprises an electrical receptacle 25 attached to the vehicle 20, preferably within the cab or interior area thereof, and having a number of exposed terminals electrically connected to various ones of the existing vehicle signal paths. For example, a first electrical terminal 24 is connected to the existing POWER/GND line via signal path 26 and a second electrical terminal 28 is connected to the existing GND/ POWER signal line via signal path 30. Terminals 24 and 28 thus supply electrical power and a ground reference to circuitry interfacing with receptacle 25, which circuitry will be discussed hereinafter. Additionally, receptacle 25 includes any of a number, N, of electrical terminals 32, 36, . . . 40 which are each electrically connected to a corresponding one of the switched inputs IN1, IN2, . . . INN of vehicle/engine control computer 12 via corresponding signal paths 34, 38, . . . 42. As will be described in greater detail hereinafter, circuitry interfacing with electrical receptacle 25 is operable to provide control computer customizing information to vehicle/engine control computer 12 via at least one of the switched inputs IN1–INN.

Figure 2:
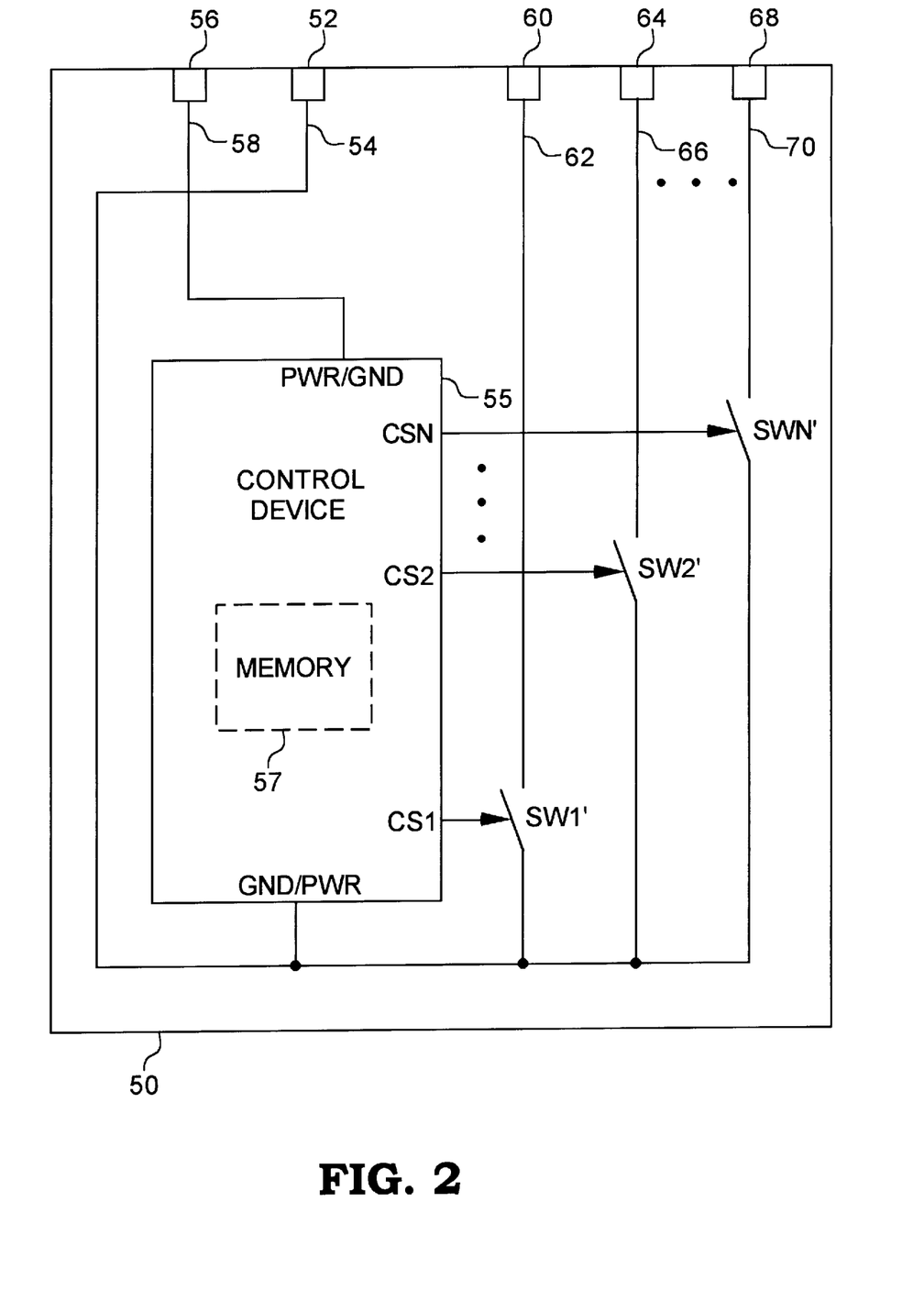
FIG. 2 is a diagrammatic illustration of one embodiment of a memory card operable with the system illustrated in FIG. 1.

In one preferred embodiment, electrical receptacle 25 is a known slot-type receptacle configured to receive a relatively flat memory card therein, wherein such a memory card includes matching electrical terminals for electrically contacting terminals 24 and 28, and at least one of terminals 32, 36, . . . 40, of electrical receptacle 25. One embodiment of such a memory card 50 is illustrated in FIG. 2 and, while card 50 and electrical receptacle 25 may be any desired size, card 50 is preferable credit card sized and electrical receptacle 25 is sized accordingly. Referring now to FIG. 2, memory card 50 includes a control device 55 having a PWR/GND input connected to an electrical terminal 52 via signal path 54, wherein electrical terminal 52 electrically contacts electrical terminal 24 of electrical receptacle 25 when memory card 50 is properly inserted therein. Control device 55 further includes a GND/PWR input connected to an electrical terminal 56 of card 50 via signal path 58, wherein electrical terminal 56 electrically contacts electrical terminal 28 of electrical receptacle 25 when memory card 50 is properly inserted therein. In this manner, control device 55 receives electrical power and a ground reference from existing vehicle power and ground lines POWER/GND and GND/POWER.

Control device 55 further includes a number of control signal outputs CS1–CSN each operable to control a corresponding switch SW1'–SWN' contained on memory card 50. One end of each switch SW1'–SWN' is connected to signal line 54 to provide POWER/GND thereto from vehicle 22 as discussed above. Each of the opposite ends of switches SW1'–SWN' are connected to a corresponding electrical terminal 60, 64 . . . 68 via signal paths 62, 66, . . . 70, wherein electrical terminals 60, 64, . . . 68 electrically contact corresponding electrical terminals 32, 36, . . . 40 of electrical receptacle 25 when memory card 50 is properly inserted therein. Control device 55 further includes a memory portion 57 containing the control computer customizing information, and device 55 is operable to control at least one of the switches SW1'–SWN', via control signal outputs CS1–CSN, to thereby transfer the control computer customizing information to the switched inputs IN1–INN of vehicle/engine control computer 12. Preferably, control device is a known microprocessor-based control device and is operable to transfer the control computer customizing information from memory portion 57 to vehicle/engine control computer 12 by controlling any one or more of switches SW1'–SWN' to thereby pulse the information over one or more of the corresponding signal lines 62, 66, . . . 70 as is known in the art.

Figure 3:
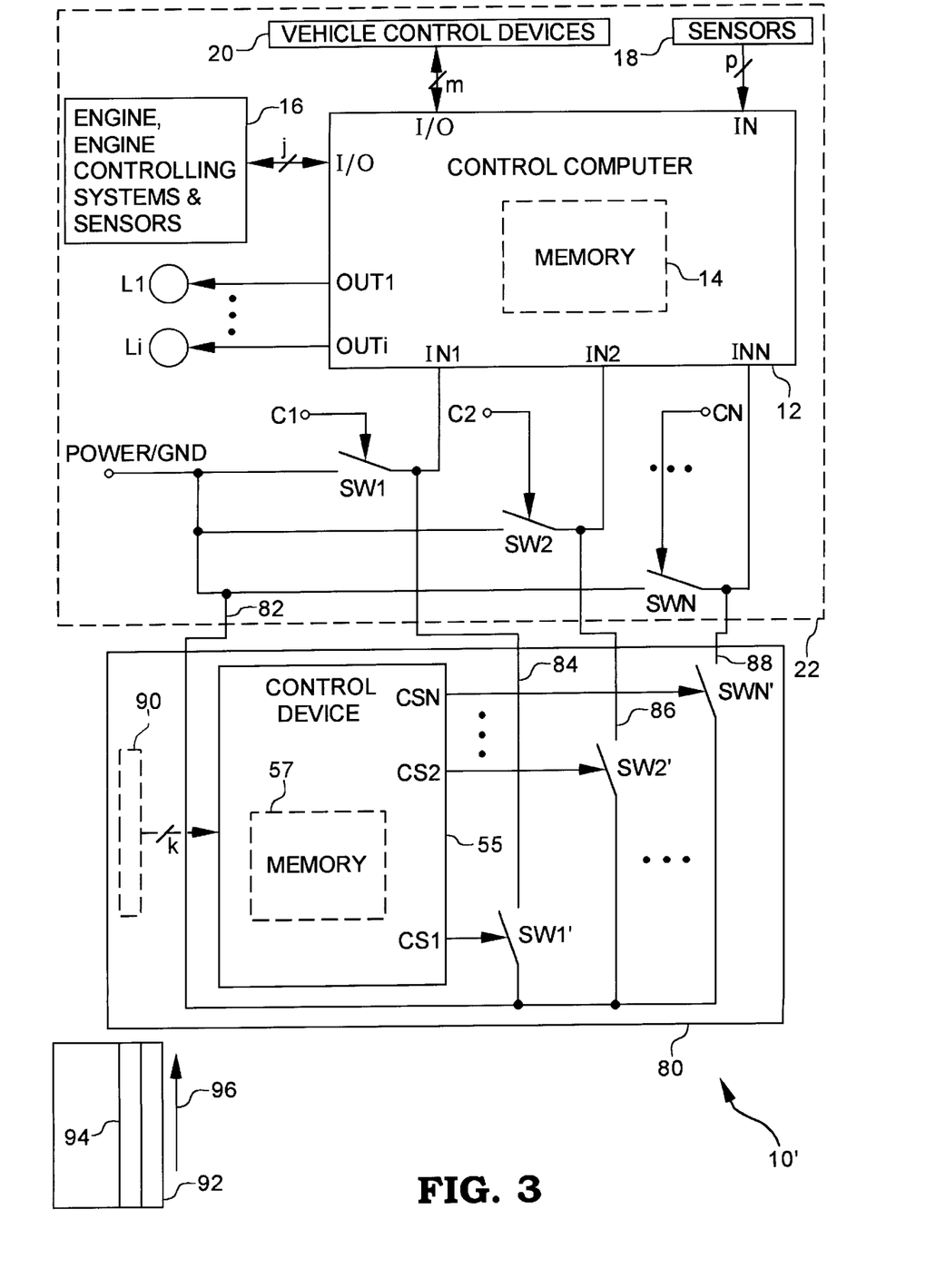
FIG. 3 is a diagrammatic illustration of an alternate embodiment of a system for customizing vehicle/engine control computer operation, in accordance with the present invention.

Referring now to FIG. 3, an alternate embodiment of additional componentry operable to interface with the vehicle/engine control computer 12 via existing signal paths comprises an electrical receptacle 80 attached to the vehicle, preferably within the cab or interior area thereof, wherein receptacle 80 incorporates the control device 55 and switches SW1' SWN' therein. The control device 55 receives electrical power and a ground reference from corresponding existing vehicle signal lines, although these connections to device 55 are not shown in FIG. 3 for brevity's sake. The existing POWER/GND line of vehicle 22 is connected to one end of each switch SW1'–SWN' via signal path 82, and the opposite ends of switches SW1'–SWN' are connected to corresponding switched inputs IN1–INN of vehicle/engine control computer 12 via signal paths 84, 86, . . . 88. As discussed hereinabove with respect to FIG. 1, control signal outputs CS1–CSN of control device 55 serve as control inputs to switches SW1'–SWN'.

In one preferred embodiment, receptacle 80 comprises a known "swipe" card reader defining a slot (not shown) therein configured to receive a card 92 carrying a magnetic strip 94 therethrough in the direction indicated by arrow 96. As is known in the art, magnetic strip 94 may be programmed with the control computer customizing information thereon. Receptacle 80 further includes a known magnetic reading device 90 within the slot thereof (not shown), which is electrically connected to control device 55 via a number, k, of signal paths, wherein k may be any integer. In operation, as is known in the art, control device 55 is operable to receive the programmed information from magnetic strip 94 as the card 92 is swiped through the slot of the receptacle 80 such that the magnetic strip passes adjacent to the magnetic reading device 90. The magnetic reading device 90 is then operable, as is known, to read a number of signals from magnetic strip 94, including at least a strobe signal and a data signal.

In accordance with one embodiment of receptacle 80, control device 55 includes a memory portion 57 and is preferably microprocessor-based. In operation, the number of signals read by magnetic reading device 90 are processed by control device 55, as is known in the art, to discern the control computer customizing information therefrom, which information is stored within memory portion 57. Control device 55 is thereafter operable, as discussed hereinabove with respect to FIGS. 1 and 2 to control switches SW1'–SWN' to thereby transfer the control computer customizing information to vehicle/engine control computer 12 via the switched inputs IN1–INN.

In accordance with another embodiment of receptacle 80, control device 55 need not include memory portion 57 and need not be microprocessor-based. In this embodiment, control device 55 need only be configured to pass the number of signals read by magnetic reading device 90, including at least the strobe signal and the data signal, directly to vehicle/engine control computer 12 via control of switches SW1'–SWN'. The vehicle/engine control computer 12 is then operable to discern the control computer customizing information from at least some of these signals.

System 10' of FIG. 3 is thus similar in operation to system 10 illustrated in FIGS. 1 and 2, except that the electrical receptacle 80 of system 10' now contains most of the hardware rather than locating such hardware on the card 50 as in system 10.

Figure 4:
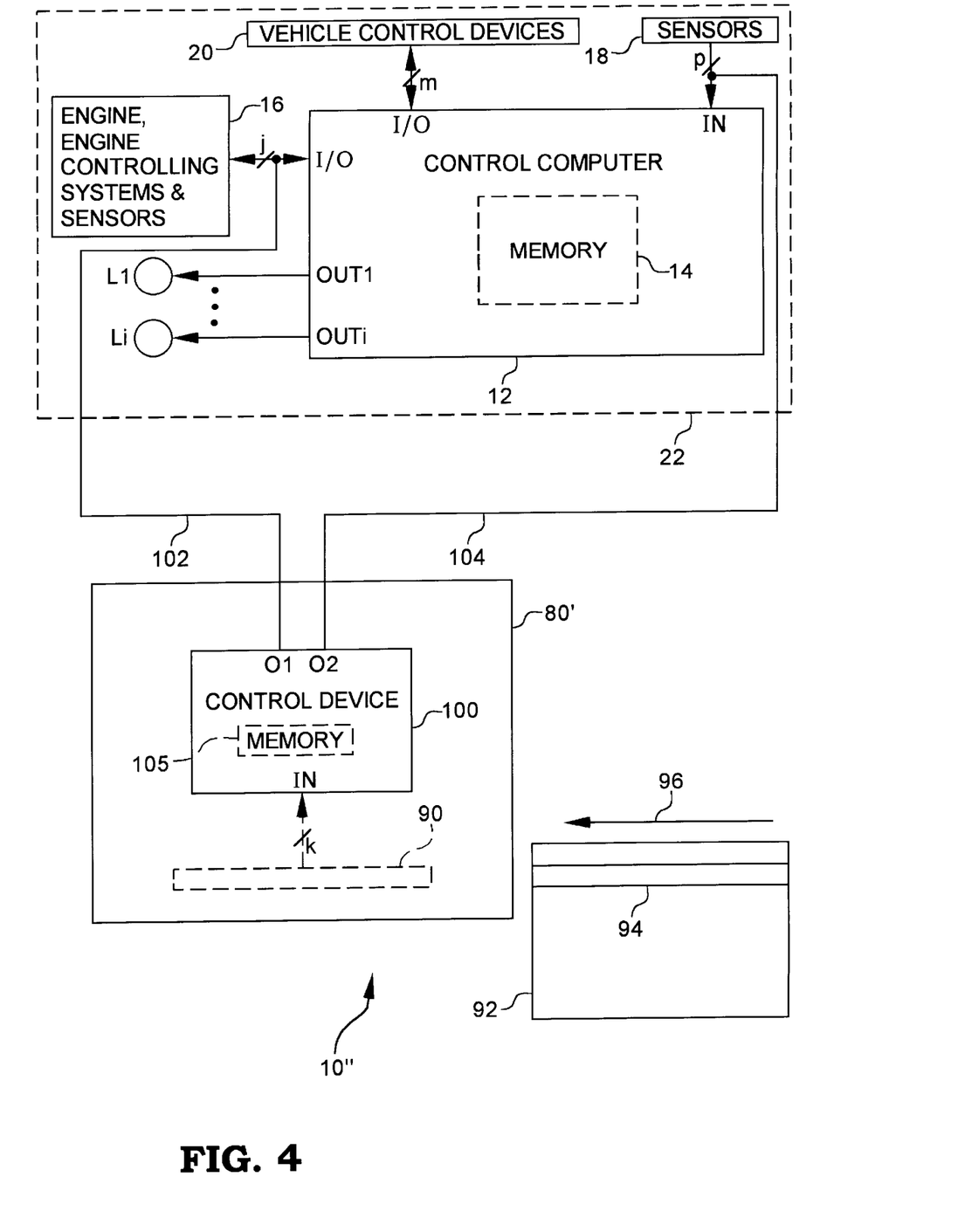
FIG. 4 is a diagrammatic illustration of another alternate embodiment of a system for customizing vehicle/engine control computer operation, in accordance with the present invention.

Referring now to FIG. 4, another alternate embodiment of additional componentry operable to interface with the vehicle/engine control computer 12 via existing signal paths comprises an electrical receptacle 80' attached to the vehicle, preferably within the cab or interior area thereof, wherein receptacle 80' incorporates a control device 100 therein. Unlike the receptacle 80 of FIG. 3, however, control device 100 includes at least a first output O1 connected to an existing high frequency input of vehicle/engine control computer 12 via signal path 102 and optionally a second output O2 connected to another existing high frequency input of vehicle/engine control computer 12 via signal path 104. In one preferred embodiment, signal path 102 is connected to an existing engine position and/or engine speed signal line and signal path 104 is connected to an existing vehicle speed signal line.

Receptacle 80' is otherwise identical to receptacle 80 illustrated and described with respect to FIG. 3 in that it preferably defines a slot therein (not shown) having a magnetic reading device 90 positioned within the slot and electrically connected to control device 100 via a number, k, of signal paths wherein k may be any integer. As with receptacle 80, the slot defined within receptacle 80' is configured to receive a card 92 having an information bearing magnetic strip 94 attached thereto, and magnetic reading device 90 is operable to transfer the programmed information from strip 94 to control device 100 when the card is swiped through receptacle 80'.

In accordance with one embodiment of receptacle 80', control device 100 includes a memory portion 105 and is preferably microprocessor-based. In operation, the number of signals read by magnetic reading device 90 are processed by control device 100, as is known in the art, to discern the control computer customizing information therefrom, which information is stored within memory portion 105. Control device 100 is thereafter operable to transfer the control computer customizing information to vehicle/engine control computer 12 over one of the high frequency signal lines 102 or 104.

In accordance with another embodiment of receptacle 80', control device 100 need not include memory portion 105 and need not be microprocessor-based. In this embodiment, control device 100 need only be configured to pass the strobe and data signals read by magnetic reading device 90 directly to vehicle/engine control computer 12 via high frequency signal lines 102 and 104. Preferably, the strobe signal is provided on one of the signal paths 102 and 104 and the data signal is provided on the remaining signal path. The vehicle/engine control computer 12 is then operable to discern the control computer customizing information from the timing and data signals.

System 10" of FIG. 4 is thus similar in operation to systems 10 and 10' illustrated in previous FIGS., except that the control computer customizing information is transferred to the vehicle/engine control computer 12 over existing high frequency signal paths rather than via the slower switched input signal paths.

Figure 5:
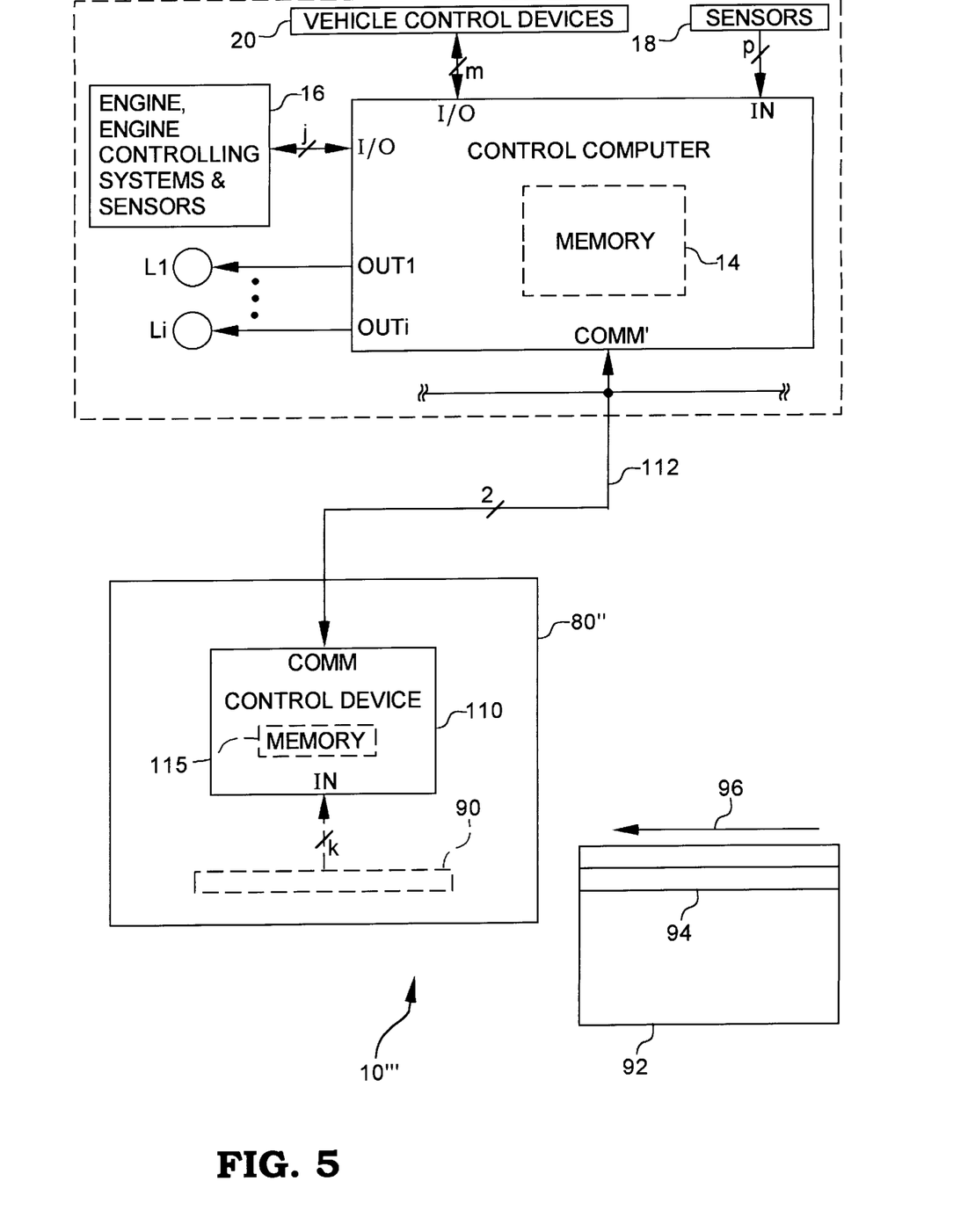
FIG. 5 is a diagrammatic illustration of yet another alternate embodiment of a system for customizing vehicle/engine control computer operation, in accordance with the present invention.

Referring now to FIG. 5, yet another alternate embodiment of additional componentry operable to interface with the vehicle/engine control computer 12 via existing signal paths comprises an electrical receptacle 80" attached to the vehicle, preferably within the cab or interior area thereof, wherein receptacle 80" incorporates a control device 110 therein. Preferably, control device 110 includes a memory portion 115 and is microprocessor-based. Receptacle 80", like receptacle 80 and 80', preferably defines a slot therein having a magnetic reading device 90 suitably positioned therein and electrically connected to control device 110 via a number, k, of signal paths wherein k may be any integer. A memory card 92 preferably includes a magnetic strip 94 attached thereto wherein strip 94 includes programmed information, such as the control computer customizing information, stored thereon. The memory card 92 is swiped through the slot defined in the receptacle 80" in the direction shown by arrow 96, and the magnetic reading device 90 is operable to read the programmed information on strip 94 and transfer this information to the control device 110 as previously described.

Control device 110 includes a communications port COMM that is electrically connected to a similar communications port COMM' of vehicle/engine control computer 12 via signal path 112. In one embodiment, signal path 112, COMM and COMM' comprise a known 2-wire serial data link, and is preferably a J1587 data link operating in accordance with standards set forth in the Society of Automotive Engineers (SAE) J1587 industry standard. It is to be understood, however, that data link 112 may be any existing serial communications line or lines connected to vehicle/engine control computer 12. In accordance with SAE J1587 standards, vehicle/engine control computer 12 continuously broadcasts public domain information over the data link 112, via the COMM' port, including such information as engine speed, vehicle speed, engine load and the like, and further includes the capability, as does the COMM port of control device 110, to transmit and receive proprietary information thereon.

In accordance with the present invention, magnetic reading device 90 is operable to read the control computer customizing information stored on magnetic strip 94 of memory card 92 as described hereinabove, and transfer this information to the control device 110 via at least some of the k signal paths. Control device 110 is further operable to process the signals provided thereto via magnetic reading device 90, determine therefrom the control computer customizing information, and store this information within memory 115 as described hereinabove. Control device 110 is then operable to transfer the control computer customizing information to the vehicle/engine control computer 12 via data link 112, preferably as proprietary information.

System 10''' of FIG. 5 is thus similar in operation to systems 10, 10' and 10" illustrated in previous FIGS., except that the control computer customizing information is transferred to the vehicle/engine control computer 12 over an existing serial data link such as an SAE J1587 data link.

Figure 6:
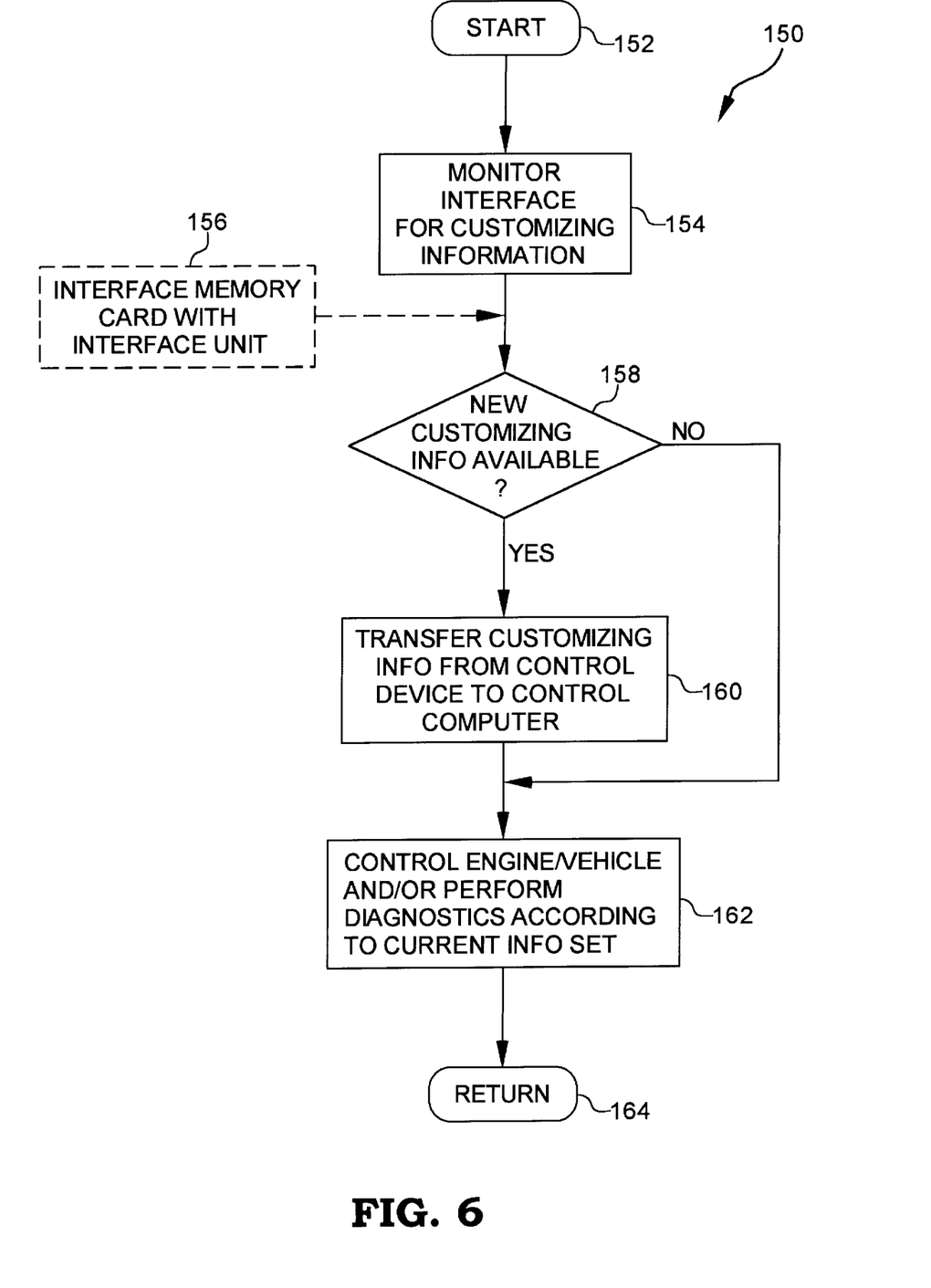
FIG. 6 is a flowchart illustrating a software algorithm, executable by a microprocessor of any of the system embodiments illustrated in FIGS. 1–5, for customizing operation of a vehicle/engine control computer, in accordance with another aspect of the present invention.

Referring now to FIG. 6, a flowchart is provided which illustrates a general software algorithm 150 for customizing vehicle/engine control computer operation, in accordance with the present invention. Those skilled in the art will recognize that software algorithm 150 represents one embodiment of the overall function of the system 10, 10', 10" or 10''' of the present invention, and that portions of the algorithm may be executed by the vehicle/engine control computer 12 and portions may be executed by the control device 55, 100 or 110 depending upon the particular configuration of the system and/or of the control device (i.e. whether or not it is microprocessor-based). In any event, algorithm 150 begins at step 152 and at step 154, the memory card interface (i.e. electrical receptacle) is monitored for control computer customizing information. The algorithm 150 remains at step 154 unless and until control computer customizing information becomes available. Thus, as shown by step 156 illustrated in phantom, the memory card (50 or 92) must, at some point, interface with its associated card interface unit (electrical receptacle 25, 80, 80' or 80"), as described hereinabove, in order for the control computer customizing information to become available for transfer to vehicle/engine control computer 12.

At step 158, it is determined whether new control computer customizing information is available. If, at step 158, new control computer customizing information is available, then step 156 must have occurred and the algorithm proceeds to step 160 where the control computer customizing information is transferred from the control device (55, 100 or 110) to the vehicle/engine control computer. After step 160, or if no new control computer customizing information was determined to be available at step 158, the algorithm proceeds to step 162. Execution of the foregoing steps 152–160 of algorithm 150 for the various system embodiments described hereinabove will now be described in detail.

In the system 10 illustrated in FIG. 1 and 2, vehicle/engine control computer 12 carries out step 154 by monitoring one or more of the switched inputs IN1–INN. Step 156 is carried out by inserting memory card 50 into electrical receptacle 25. In one embodiment of step 160, if memory card 50 is inserted into electrical receptacle 25, control device 55 is preferably operable to control one or more of the switches SW1'–SWN' to thereby send a predefined code sequence to vehicle/engine control computer 12 prior to transferring the control computer customizing information thereto. In this manner, vehicle/engine control computer is notified that a memory card 50 has been inserted into electrical receptacle 25 and control computer customizing information is forthcoming. Alternatively, vehicle/engine control computer 12 may be configured to discriminate between the rate or duration of signals provided to switched inputs IN1–INN via switches SW1–SWN and switches SW1'–SWN', and thereby determine when control computer customizing information is being transferred thereto from control device 55. In either case, control device 55 is operable to control one or more of the switches SW1'–SWN', via one or more of the control signals CS1'–CSN, to thereby transfer the control computer customizing information to the vehicle/ engine control computer 12 via at least one of the existing switched inputs IN1–INN as described hereinabove.

In system 10' illustrated in FIG. 3, control device 55 carries out step 154 by monitoring the magnetic reading device 90 via one or more of the k signal lines. Step 156 is carried out by swiping memory card 92 through the slot defined in the electrical receptacle 80 such that the magnetic strip 94 passes adjacent to the magnetic reading device 90. In one embodiment of step 160, if control device 55 is not microprocessor-based and does not include memory portion 57, control device 55 is preferably operable to transfer at least the strobe and data signals read by magnetic reading device 90 to at least some of the switched inputs IN1–INN of vehicle/engine control computer 12, via control of switches SW1'–SWN', and computer 12 is preferably configured to identify such signals as incoming control computer customizing information. Alternatively, control device 55 may be configured to be responsive to information provided thereto from magnetic reading device 90 to control one or more of the switches SW1'–SWN' in a predetermined manner to thereby transfer a predefined code to one or more of the switched inputs IN1–INN, thus notifying vehicle/engine control computer 12 that control computer customizing information is forthcoming. If, on the other hand, control device 55 is microprocessor-based and includes memory portion 57, control device 55 preferably carries out step 160 by being responsive to information provided thereto from magnetic reading device 90 to receive the information, determine the control computer customizing information therefrom, and store it within memory portion 57. In any event, control device 55 is operable to control one or more of the switches SW1'–SWN', via one or more of the control signals CS1'–CSN, to thereby transfer the control computer customizing information to the vehicle/engine control computer 12 via at least one of the existing switched inputs IN1–INN as described hereinabove.

In system 10" illustrated in FIG. 4, control device 100 carries out step 154 by monitoring the magnetic reading device 90 via one or more of the k signal lines. Step 156 is carried out by swiping memory card 92 through the slot defined in the electrical receptacle 80' such that the magnetic strip 94 passes adjacent to the magnetic reading device 90. In one embodiment of step 160, if control device 100 is not microprocessor-based and does not include memory portion 105, control device 100 is preferably operable to transfer at least the strobe signal read by magnetic reading device 90 to vehicle,/engine control computer 12 via one of the high frequency signal paths 102 or 104, and to transfer at least the data signal read by magnetic reading device 90 to vehicle/engine control computer 12 via the remaining one of the high frequency signal paths 102 or 104. Computer 12 is preferably configured to identify such signals as incoming control computer customizing information. If, on the other hand, control device 100 is microprocessor-based and includes memory portion 105, control device 100 is preferably responsive to information provided thereto from magnetic reading device 90 to receive the information, determine the control computer customizing information therefrom, and store it within memory portion 105. In either case, control device 100 is operable to transfer the control computer customizing information to the vehicle/engine control computer 12 over at least one of the existing high frequency signal paths 102 and 104.

In system 10''' illustrated in FIG. 5, control device 110 carries out step 154 by monitoring the magnetic reading device 90 via one or more of the k signal lines. Step 156 is carried out by swiping memory card 92 through the slot defined in the electrical receptacle 80" such that the magnetic strip 94 passes adjacent to the magnetic reading device 90. In one embodiment of step 160, control device 110 is preferably responsive to information provided thereto from magnetic reading device 90 to receive the information, determine the control computer customizing information therefrom, and store it within memory portion 115. Thereafter, control device 110 is operable to transfer the control computer customizing information to the vehicle/engine control computer 12 over the existing data link 112.

Referring once again to FIG. 6, step 162 is executed by vehicle/engine control computer 12. Once the control computer customizing information is transferred to vehicle/engine control computer 12, control computer 12 is operable to control the various engine/vehicle and/or perform engine/vehicle diagnostics according to the current information set (i.e. the information within memory 14 as modified by the control computer customizing information). Thereafter at step 164, the algorithm 150 returns to its calling routine. Alternatively, step 164 may direct algorithm 150 back to step 152 for continuous execution of algorithm 150.

In general, the control computer customizing information is used to customize the way in which it controls the engine 16 or vehicle 22, as well as the way in which it performs engine and/or vehicle diagnostics including recordation of data. Examples of control computer customizing information include, but are not limited to, anti-theft information (i.e. the memory card provides a specific code to the vehicle/engine control computer 12 to disable starting thereof), engine fueling information (i.e. altering engine fueling quantities and/or timing to thereby achieve fuel economy goals, environmental goals or to provide additional power to specific drivers and/or for difficult routes), driver performance information (i.e. driver identification) for "logging in" drivers by recording operating parameters specific to that driver (e.g. mpg, route time, number of panic stops, engine idling time, etc.) or for providing the vehicle/engine control computer with route specific information, and the like. The control computer customizing information may also be used to track and record engine/vehicle maintenance information. For example, the memory card may comprise an oil change card which is used to interface with the system of the present invention to thereby record the oil change event, mileage at the time of oil change and to possibly reset an oil change monitor feature of the engine/vehicle control computer 12. It is to be understood that the foregoing examples of control computer customizing information are provided merely for illustrative purposes and should not be considered to be limiting. Rather, the present invention contemplates customizing any functional aspect of the vehicle/engine control computer 12 via one or more of the techniques described hereinabove.

Regardless of the type of control computer customizing information transferred from the memory card to the vehicle/engine control computer 12, the vehicle/engine control computer 12 is preferably operable to control one or more of the illumination devices L1–Li, according to a first predefined pattern or sequence thereof, to thereby provide a visual indication that information is being transferred from the memory card to the vehicle/engine control computer 12. Preferably, vehicle/engine control computer is further operable to control one or more of the illumination devices L1–Li, according to a second predefined pattern or sequence thereof, to thereby provide a visual indication that such information transfer is complete and the vehicle/engine control computer 12 is now ready for operation in accordance with the control computer customizing information.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected. For example, while the electrical receptacles 80, 80' and 80" have been shown and described as preferably comprising swipe-type card reading structures operable to read programmed information from a magnetic strip bearing card, it is to be understood that receptacles 80, 80' and 80" may alternatively comprise other known information transferring systems including contacting systems such as magnetic disks and the like, and contactless systems including infrared or microwave transmission systems. In such a contactless system, the information card 90 may alternatively comprise a portion of a key chain or similar structure, and may include a suitable transmitter operable to transmit a radio or microwave frequency code to a corresponding receiver on board receptacle 80, 80' or 80" to thereby achieve the desired information transfer. As another example, the present invention contemplates providing electrical receptacle (25, 80, 80' or 80") with one or more illumination devices, as is known in the art, and which are controlled by control device (55, 100 or 110) or vehicle/engine control computer 12 to provide a visual indication of whether the information programmed onto strip 94 was properly read by magnetic reading device 90.

What is claimed is:

1. A system for customizing operation of a vehicle/engine control computer comprising:
   a vehicle/engine control computer having a number of existing signal paths connected to a corresponding number of inputs thereof;
   a memory card including means for storing control computer customizing information thereon; and
   a memory card interface unit electrically connected to said vehicle/engine control computer via at least one of said number of existing signal paths, said memory card interface unit transferring said control computer customizing information from said memory card to said vehicle/engine control computer over said at least one of said number of existing signal paths, said vehicle/engine control computer thereafter operating in accordance with said control computer customizing information.

2. The system of claim 1 wherein said number of existing signal paths includes a plurality of switched signal paths connected to a corresponding plurality of switched signal inputs of said vehicle/engine control computer.

3. The system of claim 2 wherein said means for storing control computer customizing information includes a control device having a memory portion for storing control computer customizing information therein.

4. The system of claim 3 wherein said memory card further includes a plurality of switches each having one end thereof electrically connected to one of a power signal and ground potential, an opposite end thereof connected to a corresponding one of a first plurality of electrical terminals of said memory card, and a control input connected to one of a corresponding plurality of control outputs of said control device, said control device operable to control switch states of said plurality of switches to thereby transfer said control computer customizing information from said memory portion to said ones of said first plurality of electrical terminals.

5. The system of claim 4 wherein said memory card interface unit includes a slot defining a second plurality of electrical terminals therein, said slot configured to receive said memory card therein with said first plurality of electrical terminals electrically contacting said second plurality of electrical terminals to thereby transfer said control computer customizing information from said memory portion to said plurality of switched inputs of said vehicle/engine control computer.

6. The system of claim 2 wherein said memory card interface unit includes:
   means for extracting said control computer customizing information from said means for storing control computer customizing information; and
   a control device in communication with said means for extracting said control computer customizing information, said control device collecting said control computer customizing information provided thereto.

7. The system of claim 6 wherein said memory card interface unit further includes a plurality of switches each having one end thereof electrically connected to one of a power signal and ground potential, an opposite end thereof connected to a corresponding one of said switched inputs, and a control input connected to one of a corresponding plurality of control outputs of said control device, said control device operable to control switch states of said plurality of switches to thereby transfer said control computer customizing information from said memory card to said plurality of switched inputs of said vehicle/engine control computer.

8. The system of claim 7 wherein said means for storing control computer customizing information includes a magnetic strip attached to said memory card;
   and wherein said means for extracting said control computer customizing information from said means for storing control computer customizing information includes a magnetic strip reading device.

9. The system of claim 1 wherein said memory card interface unit includes:
   means for extracting said control computer customizing information from said means for storing control computer customizing information; and
   a control device in communication with said means for extracting said control computer customizing information, said control device collecting said control computer customizing information provided thereto.

10. The system of claim 9 wherein said means for storing control computer customizing information includes a magnetic strip attached to said memory card;
    and wherein said means for extracting said control computer customizing information from said means for storing control computer customizing information includes a magnetic strip reading device.

11. The system of claim 10 wherein said control device includes a first output connected to a first one of said number of existing signal paths and a second output connected to a second one of said number of existing signal paths, said control device operable to receive at least a strobe signal and a data signal from said magnetic strip reading device and provide said strobe signal at said first output and said data signal at said second output.

12. The system of claim 11 wherein said first one of said number of existing signal paths is one of an engine speed signal path and a vehicle speed signal path, and said second one of said number of existing signal paths is the other of said engine speed signal path and said vehicle speed signal path.

13. The system of claim 10 wherein said control device is operable to receive at least a strobe signal and a data signal from said magnetic strip reading device, said control device including means for processing said strobe and data signals and decoding said control computer customizing information therefrom.

14. The system of claim 9 wherein at least two of said number of existing signal paths comprise a data link;

and wherein said control device is electrically connected to said vehicle/engine control computer via said data link.

15. The system of claim 14 wherein said data link is an SAE J1587 data link.

16. The system of claim 14 wherein said means for storing control computer customizing information includes a magnetic strip attached Lo said memory card;

and wherein said means for extracting said control computer customizing information from said means for storing control computer customizing information includes a magnetic strip reading device.

17. The system of claim 16 wherein said control device is operable to receive at least a strobe signal and a data signal from said magnetic strip reading device, said control device including means for processing said strobe and data signals and decoding said control computer customizing information therefrom.

18. The system of claim 1 further including means for notifying an operator of said system that said system is in the process of transferring said control computer customizing information from said memory card to said vehicle/engine control computer.

19. The system of claim 18 wherein said means for notifying is further operable to notify said operator when the transfer of said control computer customizing information from said memory card to said vehicle/engine control computer is complete.

20. The system of claim 19 wherein said means for notifying includes at least one existing vehicle information illumination device.

21. A method of customizing operation of a vehicle/engine control computer via control computer customizing information contained on a memory card, the vehicle/engine control computer having a number of existing signal paths connected to a corresponding number of inputs thereof and a memory card interface unit connected thereto via at least one of the number of existing signal paths, the method comprising the steps of:

monitoring the memory card interface unit for the presence of control computer customizing information;

transferring the control computer customizing information to the vehicle/engine control computer via the at least one existing signal path upon detection of the control computer customizing information at the memory card interface unit; and operating the vehicle/engine control computer in accordance with the control computer customizing information.

22. The method of claim 21 further including the step of interfacing the memory card with the memory card interface unit.

23. The method of claim 22 further including the step of extracting the control computer customizing information from the memory card.

24. The method of claim 21 wherein the step of transferring the control computer customizing information to the vehicle/engine control computer includes transferring the control computer customizing information to the vehicle/engine control computer via control of a number of switches each connected to existing switched inputs of the vehicle/engine control computer.

25. The method of claim 21 wherein the step of transferring the control computer customizing information to the vehicle/engine control computer includes transferring the control computer customizing information to the vehicle/engine control computer over at least one existing high frequency signal path connected to the vehicle/engine control computer.

26. The method of claim 21 wherein the step of transferring the control computer customizing information to the vehicle/engine control computer includes transferring the control computer customizing information to the vehicle/engine control computer over an existing data link connected to the vehicle/engine control computer.

* * * * *